United States Patent [19]

Staudt, III

[11] Patent Number: 5,260,780
[45] Date of Patent: Nov. 9, 1993

[54] VISUAL INSPECTION DEVICE AND PROCESS

[75] Inventor: John J. Staudt, III, Galveston, Tex.

[73] Assignee: Threadmasters, Inc., Houston, Tex.

[21] Appl. No.: 792,813

[22] Filed: Nov. 15, 1991

[51] Int. Cl.$^5$ .............................................. H04N 7/18
[52] U.S. Cl. ...................................... 358/107; 358/101
[58] Field of Search ................................. 358/101, 107

[56] References Cited

U.S. PATENT DOCUMENTS

| | | | |
|---|---|---|---|
| 4,135,817 | 1/1979 | Young | 358/107 |
| 4,520,389 | 5/1985 | Hornschuh | 358/107 |
| 4,581,762 | 4/1986 | Lapidus | 358/107 |
| 4,644,394 | 2/1987 | Reeves | 358/101 |
| 4,727,179 | 2/1988 | Schmalfuss | 358/107 |

*Primary Examiner*—Howard W. Britton
*Attorney, Agent, or Firm*—Gordon T. Arnold; John R. Kirk, Jr.

[57] ABSTRACT

A vision inspection system capable of high resolution of distanced portions of the same part is provided, allowing for dimensional calculations to be made on large parts with high resolution. A process for inspection of a part is provided, comprising the steps of: mapping a first portion of the part; mapping a second portion of the part; defining a first reference coordinate corresponding to a first reference point located on the first portion of the part; defining a second reference coordinate corresponding to a second reference point located on the second portion of the part; determining the number of coordinates between the first reference coordinate and the second reference coordinate; calculating a constant corresponding to a third portion of the part, wherein the third portion of the part is not mapped; and adding the constant to the number of coordinates between the first and the second reference coordinates.

15 Claims, 2 Drawing Sheets

VISUAL INSPECTION DEVICE AND PROCESS

BACKGROUND OF THE INVENTION

The present invention relates to vision inspection systems and processes which determine interrelationships between dimensions of parts to be inspected.

Mechanical tolerance testing of parts (for example, testing of threaded members by ring gauges, taper gauges, lead gauges, thread gauges, rulers and scales) have been used for years. Slip gauges and other apperati (for example, the AccuThread® gauge by Coulter Services, Inc; Actis® by TuboScope, Inc; MRP® gauges by gagemaker, Inc.) have also been used. Finally, visual inspection systems have recently been used for inspection of parts such as bolts coming off of assembly lines, as described in U.S. Pat. No. 4,581,762, incorporated by reference.

A common failing of all of the above mechanical measurement processes and devices is the inability to measure a wide variety of differently sized parts. For example, for each threaded size pipe to be measured, a different size gauge must be on hand to measure the various parameters required (examples of the parameters to be measured include pitch diameter, ovality, lead, taper, thread height, and L4 (the distance from the end of the pen to the last visible thread). Visual inspection systems have been limited by the resolution of the imaging techniques applied. For example, a wide angle lens, (which is capable of including a large device in its field of view) has less resolution than a more narrow angle lens, when both are set at the same distance from the object to the image. Increased fields of view can be accomplished by backing up narrow angle lens, but again, resolution is compromised.

Accordingly, there is a need for a measurement process system which is accurate over a wide variety of sizes and shapes of parts. There is also a need for the resolution achieved in visual inspection systems using narrow angle cameras in inspection of large parts (for example, oil field pipe threads).

SUMMARY OF THE INVENTION

According to one embodiment of the invention, there is provided a process for inspection of a part comprising the steps of: mapping a first portion of the part; mapping a second portion of the part; defining a first reference coordinate corresponding to a first reference point located on the first portion of the part; defining a second reference coordinate corresponding to a second reference point located on the second portion of the part; determining the number of coordinates between the first reference coordinate and the second reference coordinate; calculating a constant corresponding to third portion of the part, wherein the third portion of the part is not mapped; and adding the constant to the number of coordinates between the first and the second reference coordinates.

According to one aspect of the invention, the process further comprises backlighting the part with a light source; wherein the mapping of the first portion comprises: capturing the image of the first portion with a first camera; defining a first field of view which partially comprises a first image of the first portion of the part and light emitted from the light source, wherein the first portion blocks at least part of the light, creating different light intensities in differing areas of the first field of view; dividing the first field view into a first set of coordinates; assigning a coordinate intensity value to each of the first set of coordinates, wherein the coordinate intensity value of each coordinate corresponds to the light intensity at each coordinate within the first field of view; and displaying the light intensity value of each coordinate of the first set within a first portion of a display. The mapping of the second portion comprises: capturing the image of the second portion with a second camera; defining a second field of view which partially comprises a second image of the first portion of the part and light emitted from the light source, wherein the second portion blocks at least part of the light, creating different light intensities in differing areas of the second field of view; dividing the second field view into a second set of coordinates; assigning a coordinate intensity value to each of the second set of coordinates, wherein the coordinate intensity value of each coordinate corresponds to the light intensity at each coordinate within the second field of view; and displaying the light intensity value of each coordinate of the second set within a second portion of the display. The calculating comprises: determining the distance between the focal plane of the first camera and the focal plane of the second camera to provide a camera distance value and scaling the camera distance value to a camera distance coordinate value wherein the camera distance coordinate value equals the constant.

According to a further embodiment of the invention, there is provided a system for inspection of a part comprising: means for mapping a first portion of the part; means for mapping a second portion of the part; means for defining a first reference coordinate corresponding to a first reference point located on the first portion of the part; means for defining a second reference coordinate corresponding to a second reference point located on the second portion of the part; means for determining the number of coordinates between the first reference coordinate and the second reference coordinate; means for calculating a constant corresponding to third portion of the part, wherein the third portion of the part is not mapped; means for adding the constant to the number of coordinates between the first and the second reference coordinates.

According to one aspect of the invention, there is further provided means for backlighting the part with a light source; and wherein said means for mapping of the first portion comprises: means for capturing the image of the first portion with a first camera; means for defining a first field of view which partially comprises a first image of the first portion of the part and light emitted from the light source, wherein the first portion blocks at least part of the light, creating different light intensities in differing areas of the first field of view; means for dividing the first field view into a first set of coordinates; means for assigning a coordinate intensity value to each of the first set of coordinates, wherein the coordinate intensity value of each coordinate corresponds to the light intensity at each coordinate within the first field of view; and means for displaying the light intensity value of each coordinate of the first set within a first portion of a display. The means for mapping of the second portion comprises: means for capturing the image of the second portion with a second camera; means for defining a second field of view which partially comprises a second image of the first portion of the part and light emitted from the light source, wherein the second portion blocks at least part of the light, creating different light intensities in differing areas of the second field of view; means for dividing the second field view into a second set of coordinates; means for assigning a coordinate intensity value to each of the second set of coordinates, wherein the coordinate intensity value of each coordinate corresponds to the light intensity at each coordinate within the second field of view; and means for displaying the light intensity value of each coordinate of the second set within a second portion of the display. The said means for calculating comprises: means for determining the distance between the focal plane of the first camera and the focal plane of the second camera to provide a camera distance value and means for scaling the camera distance value to a camera distance coordinate value wherein the camera distance coordinate value equals the constant.

According to a further embodiment of the invention, there is provided a system for inspection of a part comprising: a computer; a first camera connected to the processor and having a first field of view; a second camera connected to the processor and having a second field of view; and a light source located behind the part; wherein the first field of view includes a first portion of the part; wherein the second field of view includes a second portion of the part; wherein the computer digitizes the first field of view to define a first digitized field of view; wherein the computer digitizes the second field of view to define a second digitized field of view; wherein the computer assigns a set of coordinate address values, one to each coordinate of each of the digitized fields of view; wherein the computer assigns a set of coordinate image values to each coordinate of each of the digitized fields of view; wherein the computer pastes the first and the second digitized fields of view together as if the first and second digitized fields of view were separate halves of the one total field of view, whereby a pasted digitized field of view is defined; wherein the distance in coordinates between any coordinate of the first digitized field of view and the second digitized field of view is corrected by a correction factor; and wherein the correction factor is determined from the distance between the first camera and the second camera.

According to a further embodiment of the invention, there is provided a process for measuring a part comprising: imaging a first portion of the part; imaging a second portion of the part, wherein a third portion located between the first portion of the part and the second portion of the part is not imaged; detecting an edge of the first portion; detecting an edge of the second portion; calculating a measurement value wherein the measurement value is dependant on the relative position of the edge of the first portion and the edge of the second portion; and correcting the measurement value, wherein the correcting is based on the third dimensions of the third portion.

According to a still further embodiment of the invention, there is provided a system for measuring a part comprising: means for imaging a first portion of the part; means for imaging a second portion of the part, wherein a third portion located between the first portion of the part and the second portion of the part is not imaged; means for detecting an edge of the first portion; means for detecting an edge of the second portion; means for calculating a measurement value wherein the measurement value is dependant on the relative position of the edge of the first portion and the edge of the second portion; and means for correcting the measurement value, wherein the correcting is based on the third dimensions of the third portion.

BRIEF DESCRIPTION OF THE DRAWINGS

For a more complete understanding of the present invention and for further advantages thereof, reference is made to the following Description of Embodiments of the Invention taken in conjunction with the accompanying Drawings, in which.

It is to be noted, however, that the appended drawings illustrate only typical embodiments of this invention, are not necessarily to scale, and are not to be considered limiting of its scope, for the invention may admit to other equally effective embodiments.

DESCRIPTION OF EMBODIMENTS OF THE INVENTION

Figure 1:
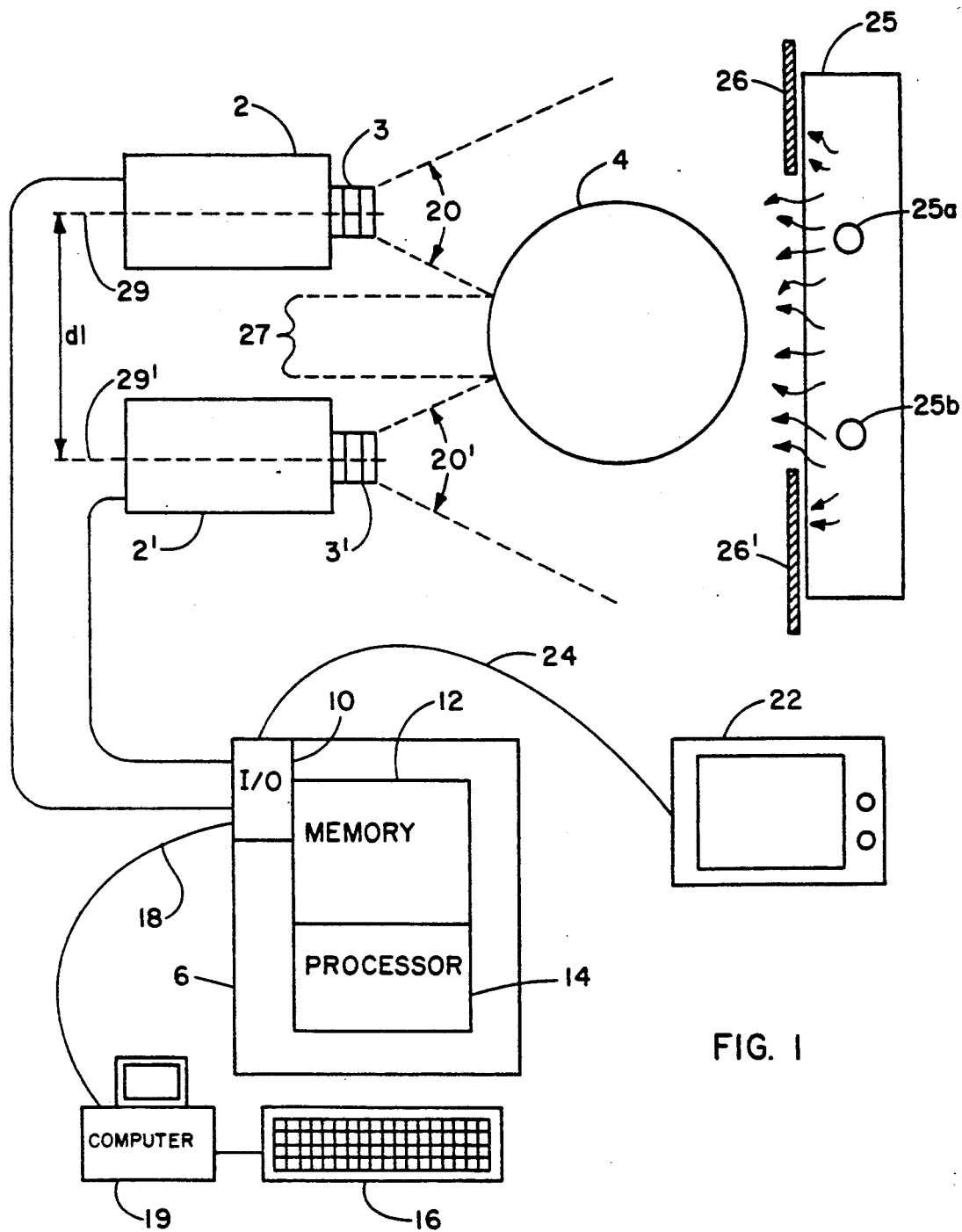
FIG. 1 is a side view of an embodiment of the invention, showing the spacial relationships between various components and how those components are interconnected.

Referring now to FIG. 1 an embodiment of the invention is shown in which there is provided a system for inspection of a part comprising: a first camera 2 and a second camera 2', which are separated each from the other by a distance d1. Also shown is a part 4 to be measured. According to one embodiment, cameras 2 and 2' comprise video cameras having 1:1.7, 35 mm lenses 3 and 3'. One acceptable lens is the Fujinon HF35A-2 ASSY MEDIUM RESOLUTION AS-CLRS-010. Associated with cameras 2 and 2' are fields of view 20 and 20', respectively.

Cameras 2 and 2' are connected to computer 6 (for example, an edge detector system such as the ITRAN Dimension Sensor DS20 or DS21) via cables 8 and 8' (for example ITRAN cable CA-XCP). Computer 6 comprises I/O port 10, memory 12, and processor 14, interconnected as is known to those of skill in the art. Also connected to computer 6 is display 22, connected as known to those of skill in the art via cable 24.

Figure 2:
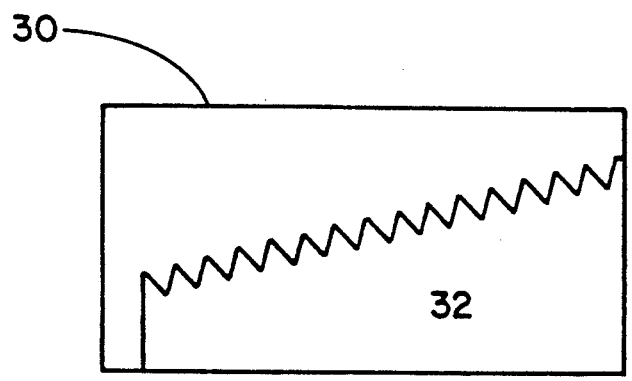
FIGS. 2–4 are examples of the screen displays of the display shown in the embodiment in FIG. 1.

Referring now to FIG. 2, a digitized image 30 is shown as it is seen on display 22 of FIG. 1. Digitized image 30 comprises a side view of part 4 (FIG. 1) in which first portion 32 of part 4 is seen in silhouette, backlit by diffused fluorescent light source 25 (FIG. 1). Fluorescent light source 25 (for example, a Lampi Model 2215 2×15 Wah fixture) includes fluorescent tubes 25a and 25b, and has blockers 26 and 26' to reduce reflections from part 4, thereby improving the contrast between portion 32 and the background in image 30 (FIG. 2). In an alternative embodiment a polarizer is used to reduce reflections, as is known to those of skill in the art.

Figure 3:
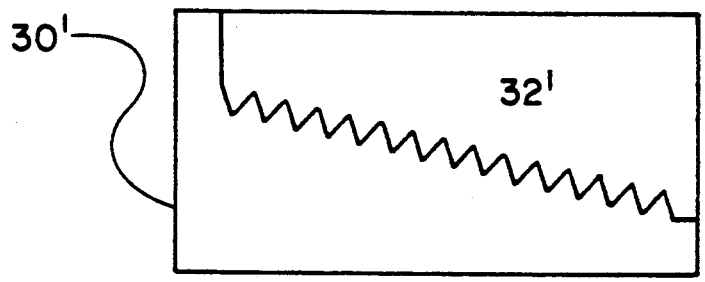

Referring now to FIG. 3, digitized image 30' corresponds to field of view 20' and shows second portion 32' of part 4.

Figure 4:
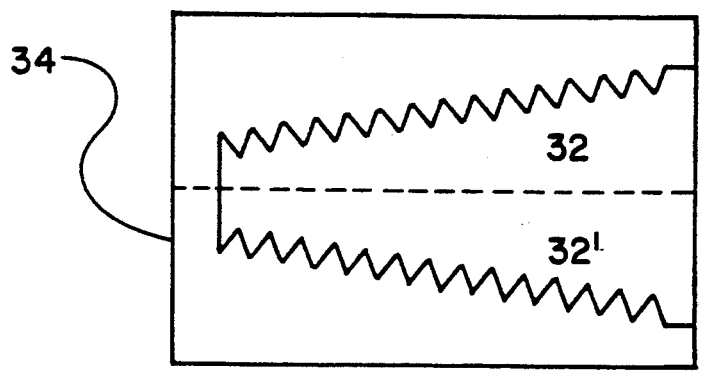

FIG. 4 shows digitized image 34, which is created by splitting the screen of display 22 and pasting image 30 and 30' together. First portion 32 and second portion 32', in this application of the invention, show opposite sides of a tapered threaded pipe (part 4), mapped by computer 6 (FIG. 1), wherein each coordinate of the mapping corresponds to a pixel on display 22. According to an alternative embodiment each pixel is further sub-divided into 32 sub-pixels, and each coordinate corresponds to a sub-pixel. Such mapping and screen splitting may be done by various processes, for example, as described in U.S. Pat. No. 4,581,762, incorporated herein by reference.

U.S. Pat. No. 4,581,762 describes a visual inspection process using certain edge detection routines which allow comparison of distances, angles and other spacial relationships of parts seen by one camera in one field of view. However, in certain applications (for example, inspection of tapered threaded pipe, the use of one light receiver (for example a camera) to image the entire part 4 as described in U.S. Pat. No. 4,581,762, is not useful for inspection, because the part is too large. Accordingly the present invention provides a plurality of cameras (in the example shown, camera 2 and 2'), and the digitized image of each is shown on a split screen as seen in FIG. 4.

According to the present invention, computer 6 (FIG. 1) has no dimensional data for that portion 27 of part 4 that is not within either field of view 20 or 20'. Therefore, after computer 6 pastes coordinates generated in the mapping of fields of view 20 and 20' together, calculations from the pasted set of coordinates, it made as described by U.S. Pat. No. 4,581,762, will be in error. Therefore, the present invention provides for a correction factor (for example, a constant) calculated from the distance d1 between the centers 29 and 29' of the focal planes of cameras 2 and 2'. According to one embodiment of the invention, such a correction factor is entered via computer 19 and keyboard 16, connected via cable 18. The correction factor is derived by measuring the difference on a manual scale, or, alternatively, by any means for automatically calculation of the distance d1 and entering the value to computer 6.

The use of such a correction factor allows edge detector measurement techniques to be used on large parts which could not be measured according to earlier techniques (such as those described in U.S. Pat. No. 4,581,762) due to the poor resolution, and therefore the poor accuracy of single camera applications.

The above described embodiments and aspects of the invention are provided by way of example, and are not intended as limitations on the scope of the invention, as it is foreseen that various embodiments and progressions in the art will practice the present invention.

What is claimed is:

1. A process for inspection of a part comprising the steps of:
mapping a first portion of the part;
mapping a second portion of the part;
defining a first reference coordinate corresponding to a first reference point located on the first portion of the part;
defining a second reference coordinate corresponding to a second reference point located on the second portion of the part;
determining the number of coordinates between the first reference coordinate and the second reference coordinate;
calculating a constant corresponding to a third portion of the part, wherein the third portion of the part is not mapped; and
adding the constant to the number of coordinates between the first and the second reference coordinates.

2. A process as in claim 1 further comprising:
capturing the image of the first portion with a first camera;
capturing the image of the second portion with a second camera; and
displaying the image of the first portion and the image of the second portion in different portions of a display.

3. A process as in claim 1 wherein said calculating comprises:
determining the distance between the focal plane of the first camera and the focal plane of the second camera to provide a camera distance value, and
scaling the camera distance value to a camera distance coordinate value wherein the camera distance coordinate value equals the constant.

4. A process as in claim 1 further comprising:
backlighting the part with a light source;
wherein said mapping of the first portion comprises:
capturing the image of the first portion with a first camera;
defining a first field of view which partially comprises
a first image of the first portion of the part and light emitted from the light source;
wherein the first portion blocks at least part of the light, creating different light intensities in differing areas of the first field of view;
dividing the first field view into a first set of coordinates;
assigning a coordinate intensity value to each of the first set of coordinates, wherein the coordinate intensity value of each coordinate corresponds to the light intensity at each coordinate within the first field of view; and
displaying the light intensity value of each coordinate of the first set within a first portion of a display;
wherein said mapping of the second portion comprises:
capturing the image of the second portion with a second camera;
defining a second field of view which partially comprises
a second image of the first portion of the part and light emitted from the light source,
wherein the second portion blocks at least part of the light, creating different light intensities in differing areas of the second field of view;
dividing the second field view into a second set of coordinates;
assigning a coordinate intensity value to each of the second set of coordinates, wherein the coordinate intensity value of each coordinate corresponds to the light intensity at each coordinate within the second field of view; and
displaying the light intensity value of each coordinate of the second set within a second portion of the display; and
wherein said calculating comprises:
determining the distance between the focal plane of the first camera and the focal plane of the second camera to provide a camera distance value and
scaling the camera distance value to a camera distance coordinate value wherein the camera distance coordinate value equals the constant.

5. A process as in claim 1 further comprising backlighting the part with a light source.

6. A process as in claim 5 further wherein said mapping of the first portion comprises:
defining a field of view, which partially comprises a first image of the first portion of the part,
light emitted from the light source, and
wherein the first portion blocks at least part of the light, creating different light intensities in differing areas of the field of view;
dividing the field view into a number of coordinates; and
assigning a coordinate intensity value to each of the coordinates, wherein the coordinate intensity value of each coordinate corresponds to the light intensity at each coordinate within the field of view.

7. A process as in claim 6 further comprising displaying the light intensity value of each coordinate on a display.

8. A system for inspection of a part comprising:
means for mapping a first portion of the part;
means for mapping a second portion of the part;
means for defining a first reference coordinate corresponding to a first reference point located on the first portion of the part;
means for defining a second reference coordinate corresponding to a second reference point located on the second portion of the part;
means for determining the number of coordinates between the first reference coordinate and the second reference coordinate;
means for calculating a constant corresponding to third portion of the part, wherein the third portion of the part is not mapped; and
means for adding the constant to the number of coordinates between the first and the second reference coordinates.

9. A system as in claim 8 further comprising:
means for capturing the image of the first portion with a first camera;
means for capturing the image of the second portion with a second camera; and
means for displaying the image of the first portion and the image of the second portion in different portions of a display.

10. A system as in claim 8 wherein said means for calculating comprises:
means for determining the distance between the focal plane of the first camera and the focal plane of the second camera to provide a camera distance value and
means for scaling the camera distance value to a camera distance coordinate value wherein the camera distance coordinate value equals the constant.

11. A system as in claim 8 further comprising:
means for backlighting the part with a light source; and
wherein said means for mapping of the first portion comprises:
means for capturing the image of the first portion with a first camera;
means for defining a first field of view which partially comprises:
a first image of the first portion of the part and light emitted from the light source,
wherein the first portion blocks at least part of the light, creating different light intensities in differing areas the first field of view;
means for dividing the first field view into a first set of coordinates;
means for assigning a coordinate intensity value to each of the first set of coordinates, wherein the coordinate intensity value of each coordinate corresponds to the light intensity at each coordinate within the first field of view; and
means for displaying the light intensity value of each coordinate of the first set within a first portion of a display;
wherein said means for mapping of the second portion comprises:
means for capturing the image of the second portion with a second camera;
means for defining a second field of view which partially comprises
a second image of the second portion of the part and
light emitted from the light source,
wherein the second portion blocks at least part of the light, creating different light intensities in differing areas of the second field of view;
means for dividing the second field view into a second set of coordinates;
means for assigning a coordinate intensity value to each of the second set of coordinates, wherein the coordinate intensity value of each coordinate corresponds to the light intensity at each coordinate within the second field of view; and
means for displaying the light intensity value of each coordinate of the second set within a second portion of the display; and
wherein said means for calculating comprises:
means for determining the distance between the focal plane of the first camera and the focal plane of the second camera to provide a camera distance value and
means for scaling the camera distance value to a camera distance coordinate value wherein the camera distance coordinate value equals the constant.

12. A system as in claim 8 further comprising means for backlighting the part with a light source.

13. A process as in claim 12 further wherein said means for mapping of the first portion comprises:
means for defining a field of view which partially comprises:
a first image of the first portion of the part and light emitted from the light source,
wherein the first portion blocks at least part of the light, creating different light intensities in differing areas of the field of view;
means for dividing the field view into a number of coordinates;
means for assigning a coordinate intensity value to each of the coordinates, wherein the coordinate intensity value of each coordinate corresponds to the light intensity at each coordinate within the field of view.

14. A system as in claim 13 further comprising means for displaying the light intensity value of each coordinate on a display.

15. A system for inspection of a part comprising:
a computer;
a first camera connected to the computer and having a first field of view;
a second camera connected to the computer and having a second field of view; and
a light source located such that the part is between said first camera and said light source;
wherein the first field of view includes a first portion of the part;

wherein the second field of view includes a second portion of the part;

wherein the computer digitizes the first field of view to define a first digitized field of view;

wherein the computer digitizes the second field of view to define a second digitized field of view;

wherein the computer assigns a set of coordinate address values, one to each coordinate of each of the digitized fields of view;

wherein the computer assigns a set of coordinate image values to each coordinate of each of the digitized fields of view;

wherein the computer pastes the first and the second digitized fields of view together as if the first and second digitized fields of view were separate halves of the one total field of view, whereby a pasted digitized field of view is defined;

wherein the distance in coordinates between any coordinate of the first digitized field of view and the second digitized field of view is corrected by a correction factor; and wherein the correction factor is determined from the distance between the first camera and the second camera.

* * * * *